US011885523B2

(12) United States Patent
Pacelli (10) Patent No.: US 11,885,523 B2
(45) Date of Patent: Jan. 30, 2024

(54) AIRFLOW APPLIANCE FOR MITIGATING SPREAD OF INFECTIOUS DISEASE (71) Applicant: Andrea Pacelli, New York, NY (US)

(72) Inventor: Andrea Pacelli, New York, NY (US)

(*) Notice: Subject to any disclaimer, the term of this patent is extended or adjusted under 35 U.S.C. 154(b) by 297 days.

(21) Appl. No.: 17/334,756

(22) Filed: May 30, 2021

(65) Prior Publication Data
US 2021/0372657 A1 Dec. 2, 2021

Related U.S. Application Data (60) Provisional application No. 63/032,560, filed on May 30, 2020.

(51) Int. Cl.
F24F 8/95 (2021.01)
B01D 46/00 (2022.01)
F24F 13/20 (2006.01)

(52) U.S. Cl.
CPC .......... *F24F 13/20* (2013.01); *B01D 46/0002* (2013.01); *F24F 8/95* (2021.01); *F24F 2013/205* (2013.01)

(58) Field of Classification Search
CPC .. F24F 13/20; F24F 8/95; B01D 46/00; B01D 46/0002; B01D 50/00
See application file for complete search history.

(56) References Cited

U.S. PATENT DOCUMENTS

| 4,140,105 A | 2/1979 | Duvlis |
| 4,248,162 A | 2/1981 | Skeist |
| 4,253,384 A | 3/1981 | Schmidt et al. |
| 4,512,245 A | 4/1985 | Goldman |
| 5,360,374 A | 11/1994 | Wyon et al. |
| 5,417,433 A | 5/1995 | Phillips |
| 5,562,286 A | 10/1996 | Brinket |
| 6,910,961 B2 | 6/2005 | Niu |
| 10,018,369 B2 | 7/2018 | Kawano |

(Continued)

FOREIGN PATENT DOCUMENTS

DE 19742358 A1 * 4/1998 ............ F24F 1/0071

OTHER PUBLICATIONS

World Health Organization, Modes of transmission of virus causing COVID-19: implications for IPC precaution recommendations (Mar. 29, 2020), https://www.who.int/news-room/commentaries/detail/modes-of-transmission-of-virus-causing-covid-19-implications-for-ipc-precaution-recommendations.

(Continued)

Primary Examiner — Robert A Hopkins (57) ABSTRACT

An airflow appliance for mitigating spread of infectious disease. The appliance may include an elongated body configured for being disposed across the top surface of a table, first and second side surfaces of the body respectively facing first and second sides of the table; at least one air intake disposed along at least one of top or side surfaces of the body; at least one air exhaust disposed along at least one of bottom or end surfaces of the body; at least one fan disposed in the body, the at least one fan drawing air from the at least one air intake and expelling air from the at least one air exhaust; wherein the at least one air intake is configured to draw air from at least one of the first and second sides of the table; and wherein the at least one air exhaust is configured to blow air away from at least one of the first and second sides of the table.

19 Claims, 10 Drawing Sheets (56) References Cited

U.S. PATENT DOCUMENTS

| | | | |
|---|---|---|---|
| 10,029,797 B2 | 7/2018 | Space et al. |
| 2003/0064675 A1 | 4/2003 | McCormick |
| 2007/0272244 A1 | 11/2007 | Witmer |
| 2020/0376305 A1 | 12/2020 | Lang |
| 2021/0016216 A1 | 1/2021 | Popa-Simil et al. |

OTHER PUBLICATIONS

Lu et al., COVID-19 Outbreak Associated with Air Conditioning in Restaurant, Guangzhou, China, 2020 (Jul. 2020), https://wwwnc.cdc.gov/eid/article/26/7/20-0764_article.

Asmelash, This restaurant in Amsterdam introduced 'quarantine greenhouses' so diners can eat while social distancing (May 7, 2020), https://www.cnn.com/2020/05/07/world/dutch-restaurant-reopen-greenhouse-trnd/index.html.

\* cited by examiner

AIRFLOW APPLIANCE FOR MITIGATING SPREAD OF INFECTIOUS DISEASE

CROSS-REFERENCE TO RELATED APPLICATIONS

This application claims the benefit of U.S. Provisional Patent Application No. 63/032,560, filed May 30, 2020, the contents of which are incorporated by reference herein.

BACKGROUND

Preventing transmission of infectious disease is crucial in public and social settings. For example, droplet and/or aerosol transmission of the SARS-CoV-2 virus causing the COVID-19 disease may occur when a person is in in close contact (e.g., within a range of approximately 1-2 meters) with someone who is infected and may have respiratory symptoms. See https://www.who.int/news-room/commentaries/detail/modes-of-transmission-of-virus-causing-covid-19-implications-for-ipc-precaution-recommendations. In public and social settings such as restaurants, it has been suggested that airflow and ventilation may play an important role in droplet and/or aerosol transmission. See https://www.nc.cdc.gov/eid/article/26/7/20-0764_article.

For example, existing approaches to addressing this problem in restaurants and similar establishments include increasing the distance between tables and improving ventilation. Increasing the physical spacing between restaurant guests may have the detrimental consequences of reducing restaurant capacity and profitability, and also altering the social experience of dining. Improving ventilation in the entire restaurant may require expensive upgrades to the air conditioning system and may have limited effects on disease transmission between guests sitting at the same table. Other proposed solutions include the use of "quarantine greenhouses" to distance groups of guests. See https://www.cnn.com/2020/05/07/world/dutch-restaurant-reopen-greenhouse-trnd/index.html. This approach may not mitigate disease transmission between guests sitting at the same table.

The same problems exist in settings such as offices, banks, retail stores, and other work areas where people are in close contact.

SUMMARY

These and other problems may be solved by the inventive appliance. In one embodiment of the invention, an appliance comprises an elongated body configured for being disposed across the top surface of a table, first and second side surfaces of the body respectively facing first and second sides of the table; at least one air intake disposed along at least one of top or side surfaces of the body; at least one air exhaust disposed along at least one of bottom or end surfaces of the body; at least one fan disposed in the body, the at least one fan drawing air from the at least one air intake and expelling air from the at least one air exhaust; wherein the at least one air intake is configured to draw air from at least one of the first and second sides of the table; and wherein the at least one air exhaust is configured to blow air away from at least one of the first and second sides of the table.

DETAILED DESCRIPTION

The following detailed description refers to the accompanying drawings which show, by way of illustration, various embodiments in which the invention may be practiced. These embodiments are described in sufficient detail to enable those skilled in the art to practice these and other embodiments. The various embodiments are not necessarily mutually exclusive, and it should be understood that each of the disclosed embodiments may be combined with one or more of each of the other embodiments. While similar features in different drawings may be referred to by different reference numerals for clarity, they may correspond to the same feature when the embodiments are combined. The following detailed description is, therefore, not to be taken in a limiting sense.

Figure 1:
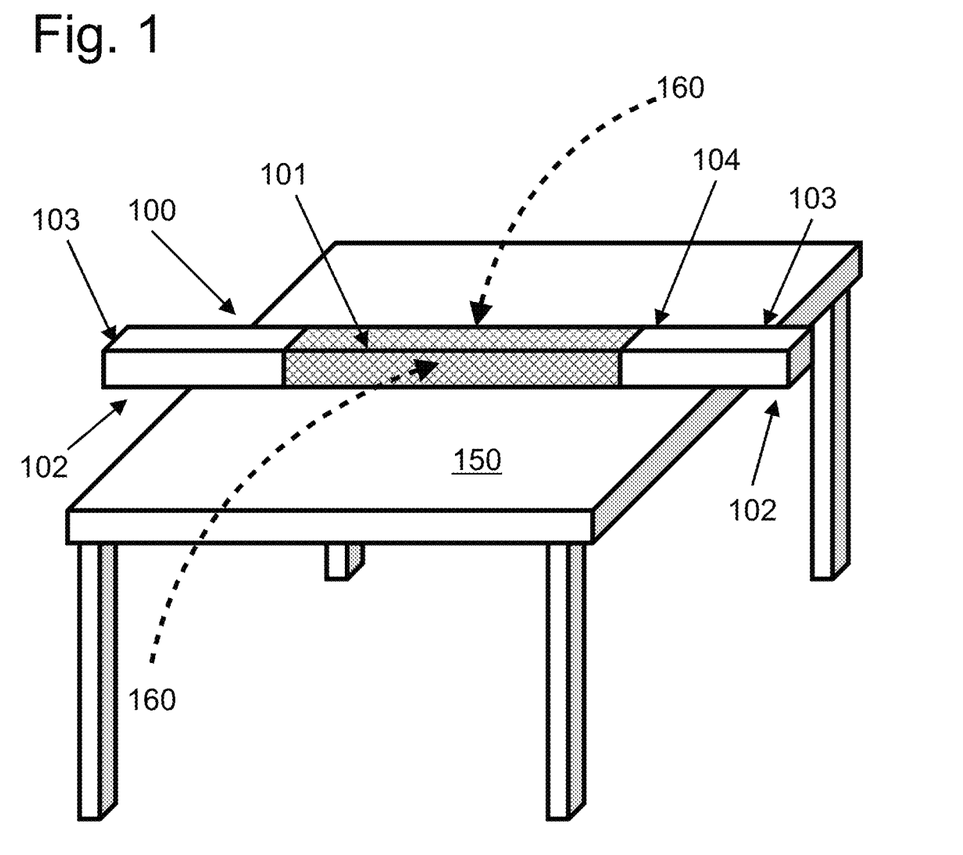
FIG. 1 depicts a perspective view of an embodiment of the invention (not to scale).

FIG. 1 depicts a perspective view of an embodiment of the invention (not to scale). Appliance 100 can be disposed, for example, across the top surface of a dining table 150. The invention is described in the context of a restaurant, but it may be equally applicable to other settings in which people sit or stand across from each other, e.g., bars, offices, food sale counters, retail and service counters, cash registers, etc. Appliance 100 may have a body 104. Body 104 may be formed of a suitable material (e.g., plastic, metal, or a combination thereof) and it may be formed in a single piece, or from multiple pieces joined together, e.g., in a shell structure. Body 104 may include one or more air intakes 101 (shown in cross-hatch) extending across one or more of the side and/or top surfaces of body 104. In FIG. 1, air intake 101 extends across the top and side surfaces of body 104, but it can also be limited to one or both side surfaces of body 104, and/or to the top surface of body 104.

Appliance 100 may also include one or more (e.g., two) air exhausts 102 (not visible in the drawing) located preferably at the bottom of body 104. Air may be drawn into air intakes 101 and blown out of air exhausts 102 by one or more fans (not shown) disposed in correspondence of air intakes 101 and/or air exhausts 102, and/or internally to body 104, as further discussed below. If air exhausts 102 are located at the bottom of body 104, the width of the body 104 may preferably be such that one or both of end portions 103 of body 104 extend beyond the edges of dining table 150 so that air exhausts 102 are not blocked by the top surface of the table. Air exhausts 102 may also be placed on end surfaces of body 104. In that case, body 104 may not necessarily extend beyond the edges of the dining table 150

(but it may also so extend). Air exhausts 102 may also be positioned at the bottom of body 104, in correspondence of openings formed in dining table 150. Appliance may also be disposed in an opening formed in dining table 150, and air exhausts may be located at the bottom of body 104.

Air intakes 101 may preferably be sized and positioned to draw air 160 from persons (e.g., restaurant guests) sitting at dining table 150. In this way, droplets and/or aerosols potentially carrying infectious disease can be captured by appliance 100 through air intakes 101 and safely expelled toward the ground or toward the sides, and therefore away from the guests, through air exhausts 102. Air drawn into appliance 100 may also be filtered and/or purified by appliance 100 prior to release through air exhausts 102. The use of filters, either fixed or removable for replacement or cleaning, may be particularly advantageous where air blown out through air exhausts 102 may reach other guests or staff, e.g., where air exhausts are disposed on end surfaces of body 104.

In FIG. 1, body 104 of appliance 100 is shown in the shape of an elongated parallelepiped. However, the outer shape of body 104 can be made of any shape to fit the aesthetics of its setting and to accommodate fans and/or electronics. For example, the top of body 104 can be made in a rounded, half-cylindrical shape, and it may have rounded end portions 103. Air intakes 101 can be formed as a single grille or multiple grilles, or as multiple perforations or slits. A smooth, flat surface with slits or small perforations may be advantageous for cleaning and sanitizing.

Appliance 100 can be built into table 150, it can be permanently or removably attached to table 150, or it can simply be disposed on table 150 as part of the table setting. One advantage of a removable arrangement is that no modification to table 150 is necessary. Also, the appliance can be removed, e.g., at the end of the day for battery charging, disinfecting, maintenance, and the like.

Advantageously, appliance 100 can be continuously running as long as it is powered, and it may require no user controls. This may simplify operation and also avoid the need for touching the appliance, which may lead to contamination. Appliance 100 may also be provided with no-touch control to turn it on or off, select fan speed, and the like. No-touch control may be provided, e.g., via voice control, gesture control, or via a wireless connection to the guests' or a service provider's electronic devices (e.g., via Bluetooth or Wi-Fi). For example, a graphical user interface (GUI) for control of appliance 100 may be provided as an application running on an electronic device. Appliance 100 may also be provided with user controls (e.g., buttons, dials, or a touch panel). Appliance 100 may also be provided with indicator lights to reassure guests that the device is in operation, for example if the device does not produce audible noise when in operation.

Figure 2:
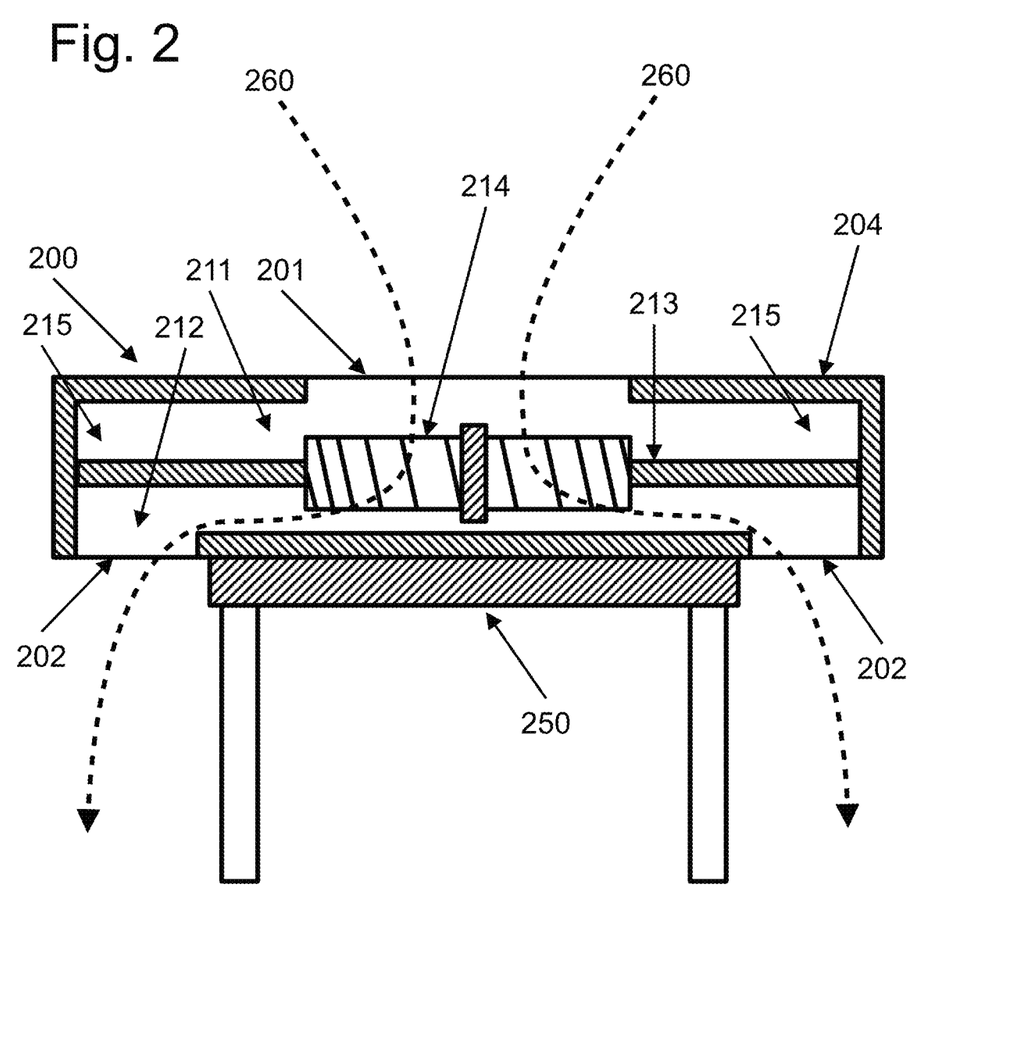
FIG. 2 depicts a cross-section of an embodiment of the invention (not to scale).

FIG. 2 depicts a cross-section of an embodiment of the invention (not to scale). Appliance 200 is shown as disposed on a dining table 250. Body 204 of appliance 200 may be divided into an upper cavity 211 and a lower cavity 212, separated by a septum 213. One or more fans 214 may be placed in one or more apertures formed in septum 213. While FIG. 1 depicts fans 214 as a single axial-flow fan, other types of fans (e.g., centrifugal fans) may be employed in each of the embodiments described herein. Further, the use of multiple smaller fans distributed along the appliance's width rather than a single fan may be advantageous to reduce the overall width of the appliance. The placement of fans 214 internal to body 204 may reduce the noise emitted toward the guests and improve aesthetics. In FIG. 2, air intakes 201 may be formed on a top surface of body 204, but they may also extend to one or both sides of body 204, or it can be limited to one or both sides of body 204.

Any unused spaces 215 in upper cavity 211 can be used for battery storage, electronics, etc. The appliance 200 can be powered by a battery, simplifying installation. If used in a public establishment such as a restaurant, the battery may only need provide power for a few hours, therefore if the fans' current draw is of the order, for example, of a few hundred milliampere or less, only a small battery is needed. If the appliance is not permanently attached to the dining table, it can be removed from the dining table at the end of each day and recharged overnight. The appliance may also be plugged in and supplied from AC or DC power, avoiding the need for recharging and/or recharging the battery while plugged in.

Air flow in appliance 200 in FIG. 2 is schematically shown by lines 260. Air may be drawn in through air intakes 201 and pass through upper cavity 211, fans 214, and lower cavity 212. Air may be eventually expelled through air exhausts 202.

Figure 3:
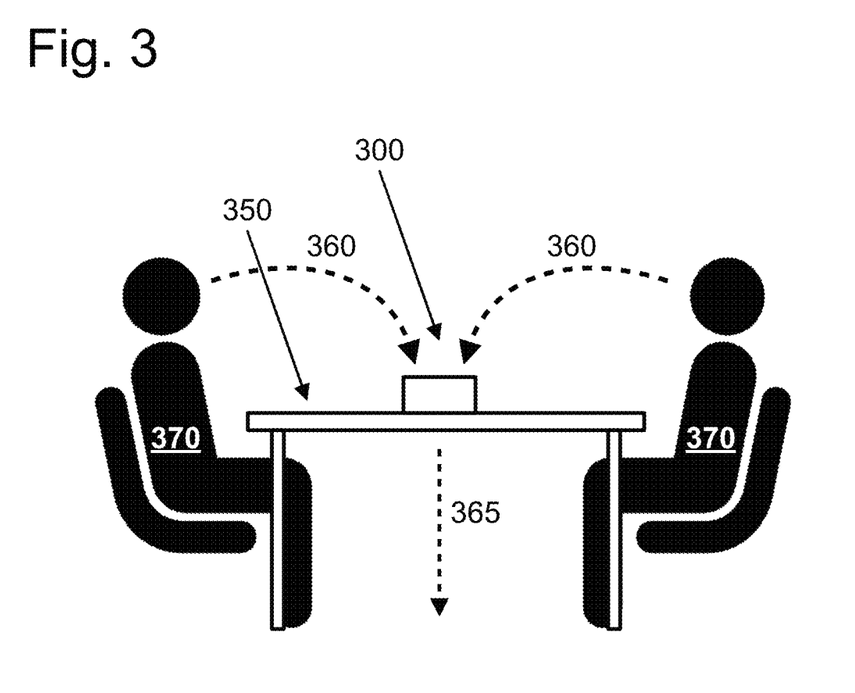
FIG. 3 depicts a side view of an embodiment of the invention when in use (not to scale).

FIG. 3 depicts a side view of an embodiment of the invention when in use (not to scale). Appliance 300 is shown as disposed (permanently or removably) on table 350. Two individuals 370 (e.g., restaurant guests) may be sitting across table 350. Appliance 300 may draw in the air flow 360 from the individuals and safely blow it out (365) toward the floor.

Figure 4:
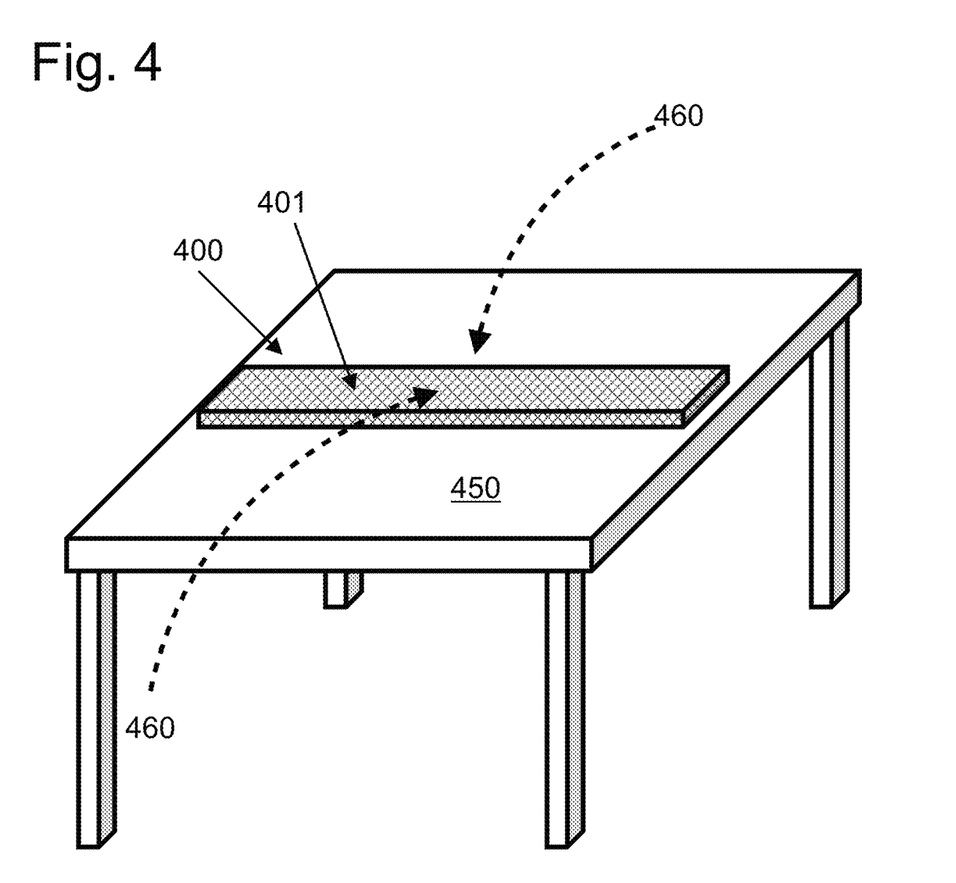
FIG. 4 depicts a perspective view of an embodiment of the invention (not to scale).

FIG. 4 depicts a perspective view of an embodiment of the invention (not to scale). Appliance 400 may be disposed in an aperture formed on the top surface of table 450, so that the appliance may extend through table 450 to, e.g., minimize the height of the appliance and allow the appliance to blend with the top surface of the table. The appliance may also be disposed on the surface of the table, and the one or more air exhausts (not shown) may be located at the bottom of appliance 400 in correspondence of smaller apertures formed in table 450. The one or more air intakes 401 may extend across part of the width of table 450, or across the entire width of the table (in which case the table may be composed of two parts joined by appliance 400). This may have the advantage of making appliance 400 unobtrusive to the guests, but it does not have the advantage of being used with existing furniture without modifications to the furniture (e.g., drilling holes through table 450). Also, in FIG. 4 the one or more air exhausts (not shown) may blow air toward the floor through the table, but sufficiently away from the guests' legs so as to prevent contamination.

Figure 5:
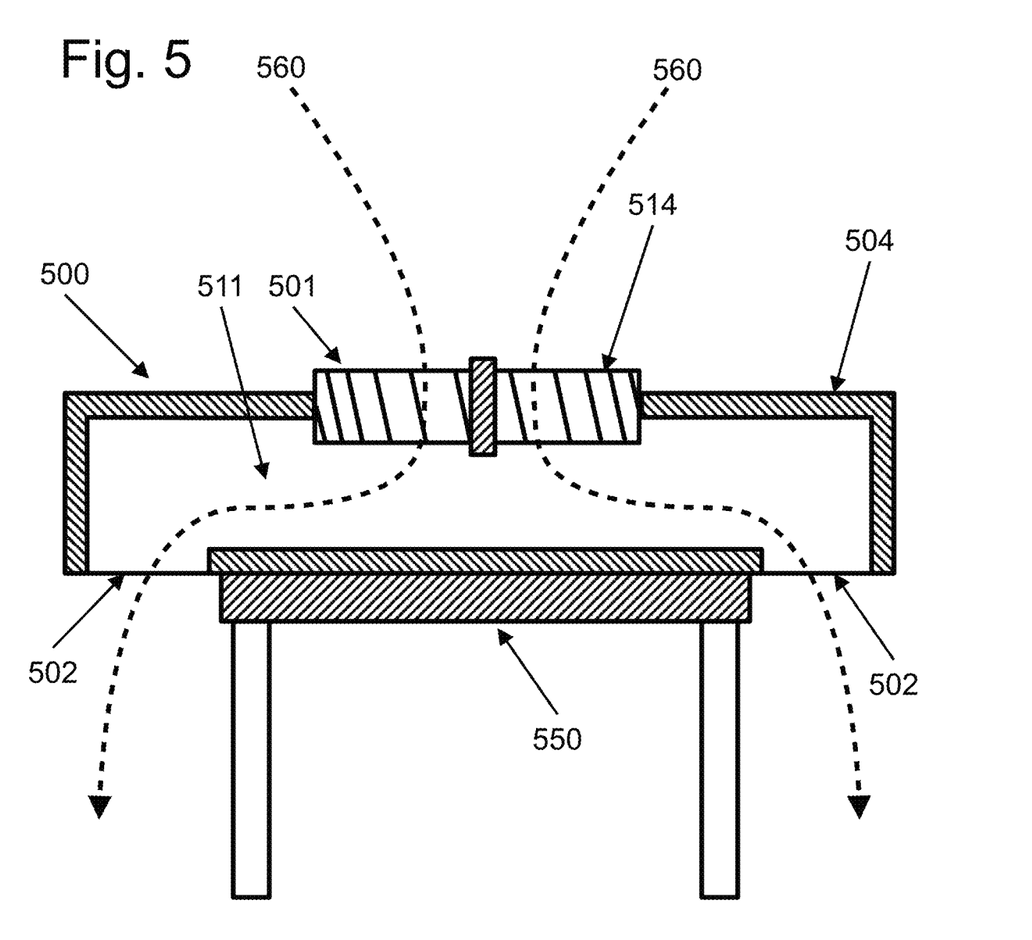
FIG. 5 depicts a cross-section of an embodiment of the invention (not to scale).

FIG. 5 depicts a cross-section of an embodiment of the invention (not to scale). Appliance 500 is shown as disposed on a dining table 550. Differently from FIG. 2, body 504 of appliance 500 may not have a septum, and may have a single cavity 511. This can simplify the construction of the appliance. One or more fans 514 may be placed directly in the one or more air intakes 501 formed in body 504. Air flow in appliance 500 in FIG. 5 is schematically shown by lines 560, from air intakes 501 to air exhausts 502.

Figure 6:
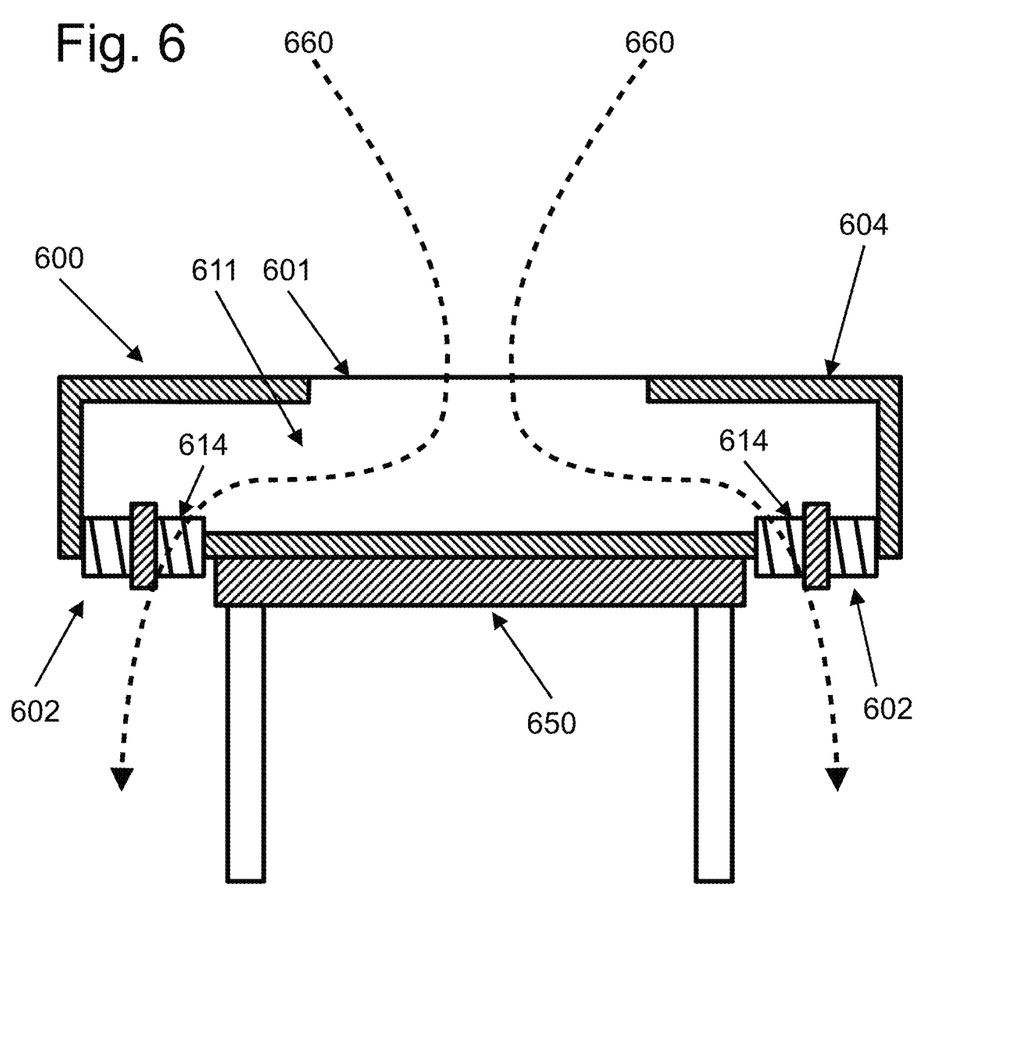
FIG. 6 depicts a cross-section of an embodiment of the invention (not to scale).

FIG. 6 depicts a cross-section of an embodiment of the invention (not to scale). Appliance 600 is shown as disposed on a dining table 650. As in FIG. 5, body 604 of appliance 600 may not have a septum, and may have a single cavity 611. This can simplify the construction of the appliance. One or more fans 614 may be placed directly in the one or more air exhausts 602 formed in body 604. If air exhausts 602 are formed on a bottom surface of the body 604 and away from guests, this placement of fans 614 may reduce the noise level. Fans 614 may also be placed in correspondence of air exhausts 602, but disposed internal to body 604 to further mitigate noise. Air flow in appliance 600 in FIG. 6 is schematically shown by lines 660, from air intakes 601 to air exhausts 602.

Figure 7:
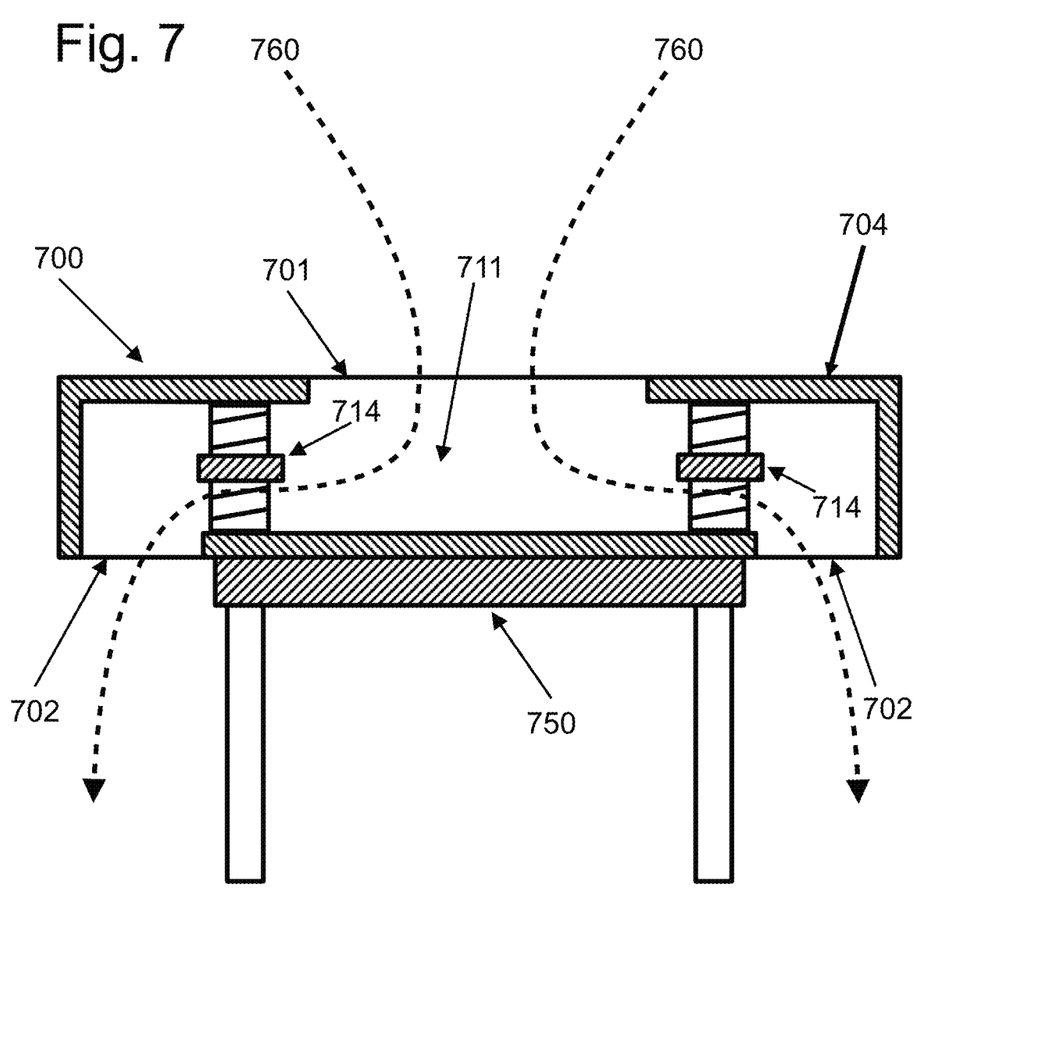
FIG. 7 depicts a cross-section of an embodiment of the invention (not to scale).

FIG. 7 depicts a cross-section of an embodiment of the invention (not to scale). Appliance 700 is shown as disposed on a dining table 750. As in FIGS. 5 and 6, body 704 of appliance 700 may not have a septum, and may have a single cavity 711. This can simplify the construction of the appliance. Also as in FIG. 6, one or more fans 714 may be placed in correspondence of one or more air exhausts 702 formed in body 704. However, in FIG. 7 fans 714 are disposed internal to body 704 to further mitigate noise. Air flow in appliance 700 in FIG. 7 is schematically shown by lines 760, from air intakes 701 to air exhausts 702.

Figure 8:
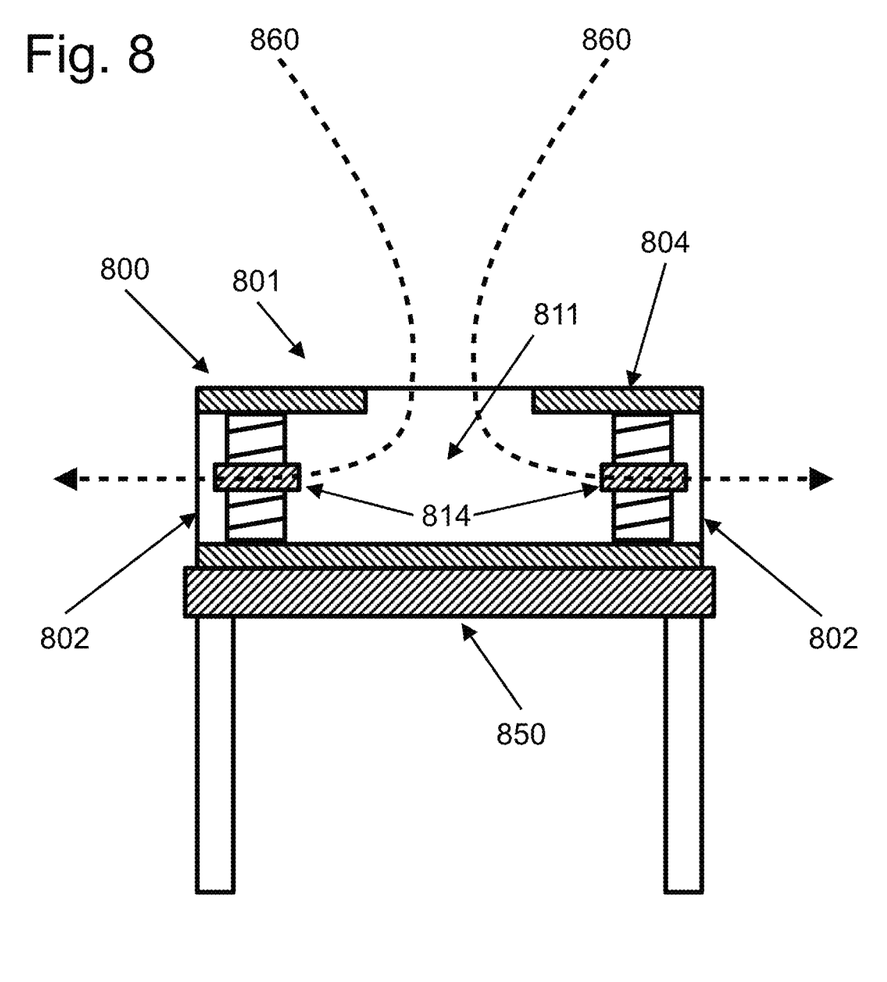
FIG. 8 depicts a cross-section of an embodiment of the invention (not to scale).

FIG. 8 depicts a cross-section of an embodiment of the invention (not to scale). Appliance 800 is shown as disposed on a dining table 850. As in FIGS. 5, 6, and 7, body 804 of appliance 800 may not have a septum, and may have a single cavity 811. This can simplify the construction of the appliance. Also as in FIGS. 6 and 7, one or more fans 814 may be placed in correspondence of one or more air exhausts 802 formed in body 804. As in FIG. 7, fans 814 may be disposed inside the body 604 to further mitigate noise. Air flow in appliance 800 in FIG. 8 is schematically shown by lines 860, from air intakes 801 to air exhausts 802. In FIG. 8, air exhausts 802 blow air out toward the sides of the table. The embodiment of FIG. 8 may have the advantage of a smaller size because body 804 does not need to extend beyond the edges of table 850.

Figure 9:
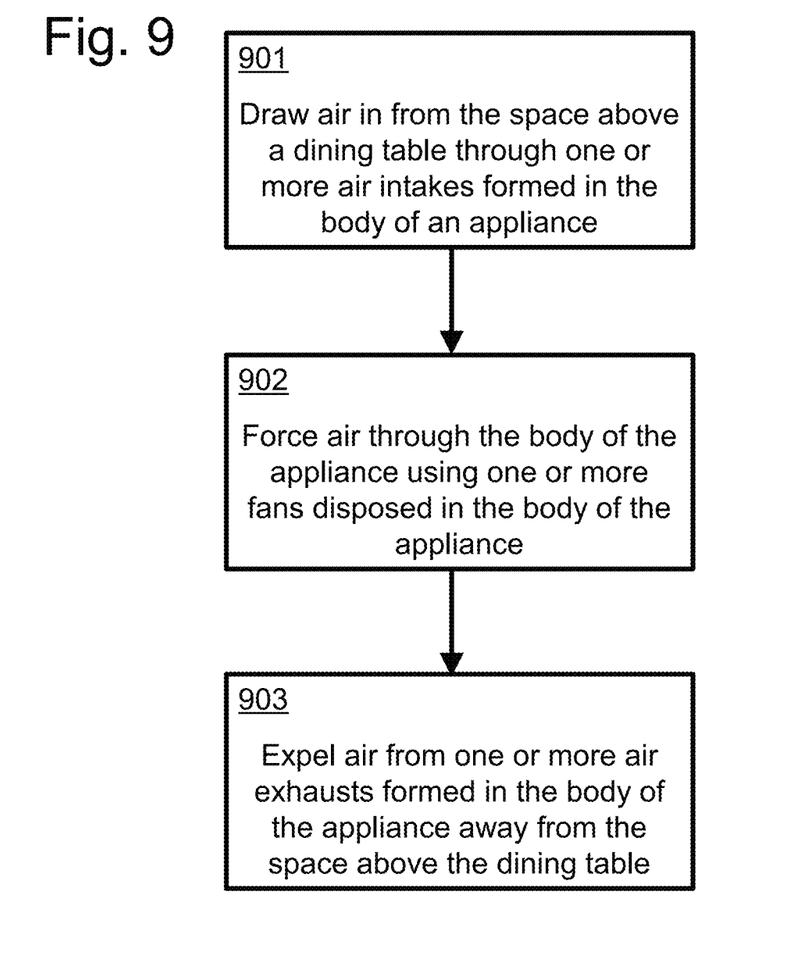
FIG. 9 depicts a method according to an embodiment of the invention.

FIG. 9 depicts a method according to an embodiment of the invention. In step 901, air (including, e.g., infectious droplets and/or aerosols) is drawn in from the space above a dining table through one or more air intakes formed in the body of an appliance. In step 902, air is forced through the body of the appliance using one or more fans disposed in the body of the appliance. In step 903, air is expelled from one or more air exhausts formed in the body of the appliance away from the space above the dining table, e.g., toward the ground or the sides.

Figure 10:
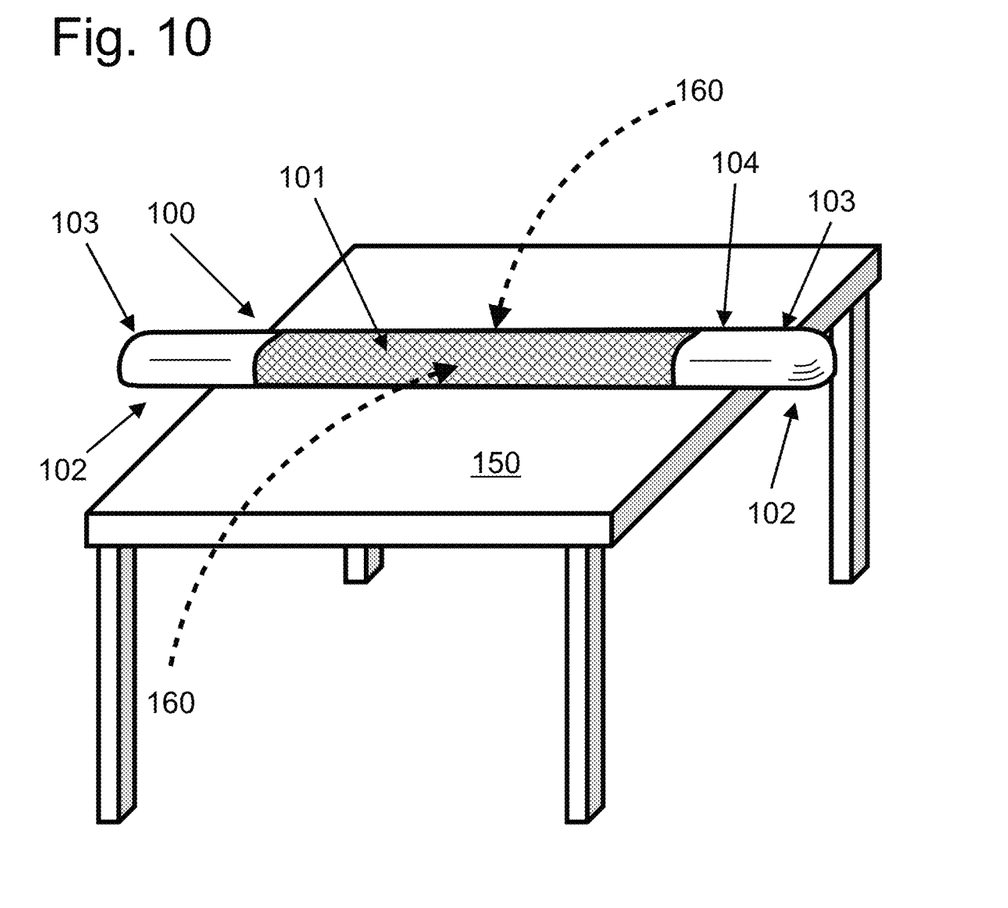
FIG. 10 depicts a perspective view of an embodiment of the invention similar to the embodiment depicted in FIG. 1 (not to scale).

FIG. 10 depicts a perspective view of an embodiment of the invention similar to the embodiment depicted in FIG. 1 (not to scale). Corresponding features in FIG. 10 and FIG. 1 have the same numerals. In the embodiment depicted in FIG. 10, the top of body 104 can be made in a rounded, half-cylindrical shape, and it may have rounded end portions 103. Also, air intake 101 has the form of a continuous, curved grille covering a majority of the top/side surface of body 104. In this case, a single continuous upper surface of body 104 includes both the top surface and the side surfaces. Otherwise put, portions of the continuous upper surface constitute the top and side surfaces of body 104. The structure and operation of the embodiment depicted in FIG. 10 is otherwise similar as for the embodiment depicted in FIG. 1.

In each of the embodiments depicted in cross-section in FIGS. 2 and 5-8, grilles may be used to cover air intakes and/or outlets for reasons of safety and noise mitigation, as shown, e.g., in FIGS. 1, 4, and 10.

In each of the disclosed embodiments, the placement of fans, air intakes and air exhausts, and air flow are not necessarily exactly perpendicular or parallel to the ground or the sides. For example, fans may be placed at an angle, and/or devices such as directional grilles, louvers, and/or baffles may be used to effect changes in the direction of air flow as needed. Likewise, top and side surfaces are not necessarily horizontal and vertical, respectively. For example, top and side surfaces may be angled with respect to the horizontal and vertical, respectively, and/or they may be upward-facing and side-facing portions of a single continuous surface, as depicted in FIG. 10. In some embodiments, the air flow may be reversed so that rather than draw air in from the top and/or side surfaces, the appliance may draw air in from the bottom and/or side surfaces and blow it out from the top and/or side surfaces, so as to move potential infectious droplets and/or aerosols from one guest away from the table and from other guests sitting at the table. Each of the embodiments described herein (including, e.g., the embodiments depicted in FIGS. 1-10) may be operated in such manner, and may also include directional grilles and/or louvers at the air exhaust point (i.e., at the top and/or side surfaces) to direct the air flow in an optimal manner.

Embodiments of the inventive appliance have multiple benefits. Because the appliance can reduce disease transmission between guests, an establishment can be operated with a larger number of guests while guaranteeing the same level of safety, or with a reduced likelihood of disease transmission for the same number of guests. The appliance may be economically produced and sold as a discrete consumer item that may be used in a variety of preexisting settings. For example, a discrete number of versions of the appliance may be produced with different body widths for use with a variety of surfaces of different widths (bistro tables, full-size tables, counters, etc.) Accordingly, use of the appliance may not require an investment in terms of special furniture, separators, etc. The visible presence of a safety appliance on the dining table may also induce guests to feel more comfortable and relaxed.

While the foregoing is a description of preferred embodiments, many variations and modifications will naturally occur to those of skill in this art from the disclosure presented herein. Various modifications and equivalent arrangements are intended to be included within the spirit and scope of the invention and appended claims. The invention is therefore not to be limited to the embodiments disclosed, but defined only by the claims when accorded a full range of equivalents.

What is claimed is:

1. An appliance comprising:
an elongated body configured for being disposed across the top surface of a table, first and second side surfaces of the body respectively facing first and second sides of the table;
at least one air intake disposed along at least one of top or side surfaces of the body;
at least one air exhaust disposed on a bottom surface of the body and substantially directed toward the ground;
at least one fan disposed in the body, the at least one fan drawing air from the at least one air intake and expelling air from the at least one air exhaust;
wherein the at least one air intake is configured to draw air from at least one of the first or second sides of the table; and
wherein the at least one air exhaust is configured to blow air away from at least one of the first or second sides of the table.

2. The appliance of claim 1, further comprising a battery disposed internally to the body for powering the at least one fan.

3. The appliance of claim 1, wherein the at least one air exhaust comprises two air exhausts disposed in at least one end portion of the body.

4. The appliance of claim 1, wherein at least one end portion of the body extends beyond an edge of the table, and the at least one air exhaust is disposed on a bottom surface of the body externally to the edge of the table.

5. The appliance of claim 1, wherein the body is divided into two cavities by a septum, and the at least one fan is disposed in an aperture formed in the septum.

6. The appliance of claim 1, wherein the body is adapted to be disposed in an aperture formed in the table, and the least one air intake is disposed along a top surface of the body.

7. The appliance of claim 1, wherein the at least one fan is disposed in the at least one air intake.

8. The appliance of claim 1, wherein the at least one fan is disposed in the at least one air exhaust.

9. The appliance of claim 1, wherein the at least one fan is disposed internally to the body.

10. The appliance of claim 1, wherein a continuous upper surface of the body comprises the side and top surfaces of the body.

11. An appliance comprising:
    an elongated body configured for being disposed across the top surface of a table, first and second side surfaces of the body respectively facing first and second sides of the table;
    at least one air intake disposed along at least one of top or side surfaces of the body;
    at least one air exhaust disposed along at least one of bottom or end surfaces of the body;
    at least one fan disposed in the body, the at least one fan drawing air from the at least one air intake and expelling air from the at least one air exhaust;
    wherein the at least one air intake is configured to draw air from at least one of the first or second sides of the table;
    wherein the at least one air exhaust is configured to blow air away from at least one of the first or second sides of the table; and
    wherein the body is divided into two cavities by a septum, and the at least one fan is disposed in an aperture formed in the septum.

12. The appliance of claim 11, further comprising a battery disposed internally to the body for powering the at least one fan.

13. The appliance of claim 11, wherein the at least one air exhaust comprises two air exhausts disposed in at least one end portion of the body.

14. The appliance of claim 11, wherein the at least one air exhaust is disposed on a bottom surface of the body and substantially directed toward the ground.

15. The appliance of claim 11, wherein the at least one air exhaust is positioned on an end surface of the body and directed substantially perpendicularly to the first and second sides of the table.

16. The appliance of claim 11, wherein at least one end portion of the body extends beyond an edge of the table, and the at least one air exhaust is disposed on a bottom surface of the body externally to the edge of the table.

17. The appliance of claim 11, wherein the body is adapted to be disposed in an aperture formed in the table, and the least one air intake is disposed along a top surface of the body.

18. The appliance of claim 11, wherein the at least one fan is disposed internally to the body.

19. The appliance of claim 11, wherein a continuous upper surface of the body comprises the side and top surfaces of the body.

* * * * *